EXPANDABLE CLAMP CIRCUIT

Filed April 20, 1967

INVENTOR.
GAINES T. SPOTTS
BY Stanley C. Corwin
HIS ATTORNEY

United States Patent Office
3,538,347
Patented Nov. 3, 1970

3,538,347

EXPANDABLE CLAMP CIRCUIT

Gaines T. Spotts, Staunton, Va., assignor to General Electric Company, a corporation of New York Filed Apr. 20, 1967, Ser. No. 638,172
Int. Cl. H03k 5/08
U.S. Cl. 307—237 11 Claims

ABSTRACT OF THE DISCLOSURE

A circuit for limiting the rate of rise of a voltage pulse after an initial clamp to a minimal value. Two transistors in parallel provide a clamp to ground for voltage pulses of either polarity which serve as the transistor power supply. A normally charged capacitor at the base of each transistor is allowed to discharge as the clamp is released, the discharge determining the rate of rise of the voltage pulse.

Figure 1:
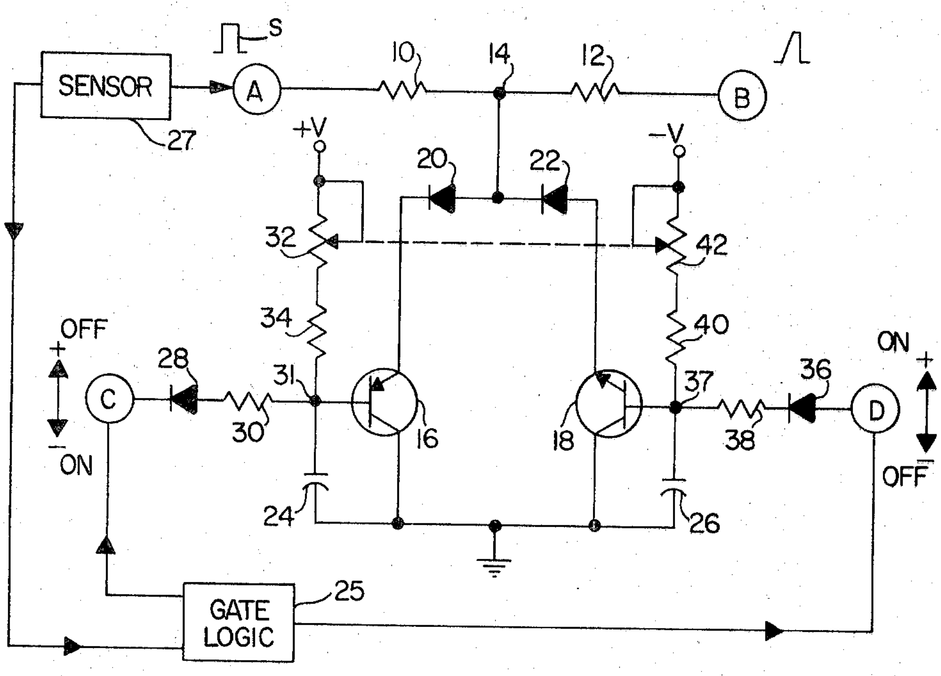

This invention relates to voltage clamps of the type that are adjustable in the rate of application or release of the clamp.

In electronic servo systems, the rate of change of the input signal must not exceed the response rate of the servo itself. Since the servo has lead or lag feedback networks to provide the proper stability with varied inertia and types of drive systems, it is important that the rate of rise of the input signal to the servo loop be limited so that no element in the feedback loop becomes saturated or inoperative. The normal procedure for reducing the rate of change of the input voltage pulse is to utilize an integrating circuit. However, the drawback of such circuits is in the introduction of phase shift into the servo loop. This phase shift is added to the phase shift introduced by the lead or lag feedback networks to result in servo position or rate error. It is thus necessary that any adjustment of the rate of change of the input signal to the servo system introduce no phase shift into the system.

It is therefore an object of the present invention to provide a circuit for limiting the rate of change of a voltage.

Another object of the invention is to provide a clamp circuit which has an adjustable release rate to control the rate of rise of a voltage pulse.

A further object of this invention is to provide an expandable clamp circuit which introduces no phase shift in the process of limiting the rate of change of a voltage.

In general, the invention is an expandable clamp circuit for limiting the rate of rise or fall of a voltage appearing on a line. The voltage whose rate of change is to be controlled serves as the supply voltage for the clamp. A pair of transistors each responsive to supply voltage of the opposite polarity provide the clamping function. An independent voltage source is utilized to charge a capacitor at the base of each transistor so that when the clamp is released, the capacitor charge limits the rate of transistor turnoff and therefore, the rate of rise of the voltage which has been clamped. Because an independent voltage source charges the capacitors, no phase shift of the clamped voltage is experienced. The clamp circuit is versatile and functions as an integrator when the clamp is released at the appearance of the voltage on the line. The clamp, on the other hand, can be maintained for a short period of time and then released. The clamp circuit may also be used to adjust the rate of decay of a voltage pulse. Here, the voltage is clamped at a rate determined by the charging of the input capacitors.

Figure 2:
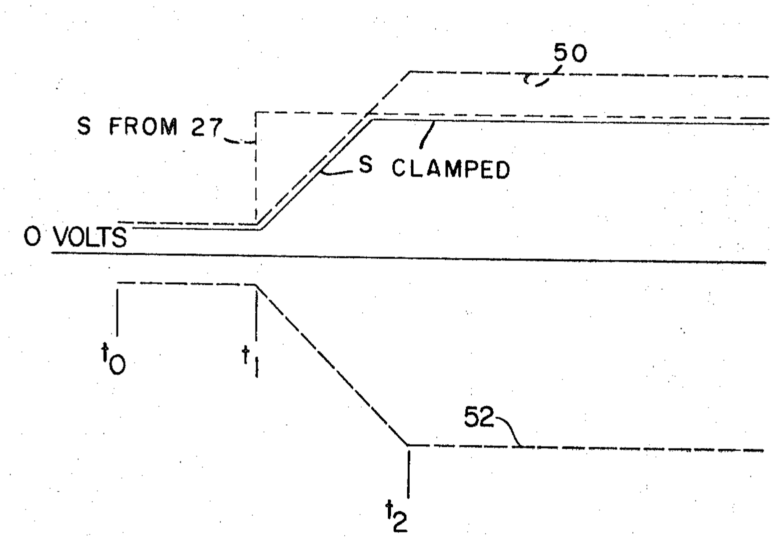

The objects and advantages of this invention will be better understood from a detailed description of one embodiment of the invention shown in the drawings, in which:

FIG. 1 is a circuit diagram of an adjustable clamp circuit according to the invention, and FIG. 2 is a voltage-time plot useful in understanding the operation of the circuit shown in FIG. 1.

Referring now to FIG. 1, there is shown a portion of a line consisting of terminal A, resistors 10 and 12 and terminal B. Terminal A is to be coupled to a source of voltage 27 such as the command source of a servo loop and terminal B is coupled to a receiver such as a servo mechanism. As shown in the figure to the left of terminal A, the voltage on this line is in the form of intermittent step functions representing signal commands. The voltage waveform at terminal B shows the effects of the clamping circuit on one such voltage pulse. Resistors 10 and 12 have been added to the line to protect the input source of terminal A and the receiver at terminal B from the effects of the substantially short circuit introduced by the clamp. The voltage pulse applied to terminal A appears at point 14 and is coupled to the emitters of transistors 16 and 18 by diodes 20 and 22, respectively. These transistors serve as the active clamping elements of the circuit and utilize the voltage appearing at terminal A as a supply voltage. Diodes 20 and 22 may be of the low leakage variety to provide added isolation between the external circuit common to terminals A and B and the voltage clamp. Without these diodes, even when transistors 16 and 18 are off, the leakage through them could drain sufficient current from the terminal A–B path to cause some mispositioning of the voltage pulse in that path. The collectors of both transistors are coupled to ground and thus the emitter-collector paths of each transistor are coupled in parallel and with the diodes 20 and 22 form a low impedance path to ground, each path being responsive to a different polarity voltage.

The base electrode of each of the transistors 16 and 18 forms part of the input or control circuit for the clamp. The input or control circuits are connected through diodes 28 and 36 to a positive or negative voltage control signal as shown at terminals C and D. With a voltage signal at 14 made available from 27, and no operating signal applied from 27 to 25, voltage at C is negative and at D is positive. With the control signal at C negative, condenser 24 is discharged through 25, transistor 16 is turned on and terminal 14 is clamped through diode 20 and transistor 16 to a minimum value as shown for the period $t_0$–$t_1$. Coupled to the base lead of 16 is a capacitor 24, the other end of which is coupled to the collector of this transistor. When the voltage at C is made positive by a control signal from 25, the capacitor 24 begins to charge to +V through resistors 34 and 32. The charge rate of the capacitor is determined by its value and the value of resistors 32 and 34. Due to the presence of diode 28, the condenser 24 is isolated from terminal C during its charging excursion. Resistor 32 is shown as being variable to control the rate of discharge of the capacitor. Because of the charge on capacitor 24, the transistor 16 is not permitted to turn off immediately but only at a rate controlled by the charging of capacitor 24.

The control voltage S at 14 (as shown in FIG. 2 in solid line) then rises along the condenser charge curve until the condenser voltage is greater than S whereupon the voltage at 14 is allowed to pass to output B with its original envelope from 27 without further clamping. When the voltage across 24 approaches that at point 14, the voltage at 14 follows the original envelope shown by dash lines in FIG. 2.

In a similar manner, with the control voltage at 14, and no operating signals applied to 25 from sensor 27, condenser 26 is held discharged by the positive voltage developed at terminal D. With the potential at 14 being a negative signal, diode 22 and transistor 18 conduct clamping the potential at 14 to the minimum value through diode 22 and transistor 18 as shown in the period $t_0$–$t_1$. With the operating signal applied to 25, the condenser 26 charges toward −V reducing the conduction of transistor 18. With the potential at 14 increasing in the negative direction, the signal at 14 will follow the charge on condenser 26 until the potential across condenser 26 is more negative than the signal S at 14, whereupon S1 continues at its normal envelope. The negative value curve of S would be a mirror image of the positive value curve shown in FIG. 2.

Several variations in circuit operation and makeup can be noted. If resistor 30 is small compared with resistors 32 and 34, capacitor 24 is charged quickly and the circuit is ready to clamp and release at the appearance of each pulse at terminal A. With near equal voltages at the top of resistor 32 and at terminal C, the low value of resistor 30 prevents the capacitor 24 from charging from the +V source. The relation between these voltages and the component values is further discussed below. It should also be noted that while the drawing shows either a positive or negative voltage being applied at terminal C, it is only necessary to remove the negative turnon voltage and let terminal C float to accomplish turnoff.

As has been mentioned, the control circuit for transistor 18 is substantially identical to the transistor 16 control circuit, and therefore only the differences need be pointed out. Since transistor 18 is polarized to clamp negative voltages, the polarity of control circuit voltages to which it responds is opposite to that of transistor 16. Thus, a positive voltage at terminal D turns on this transistor and a negative voltage applied or the removal of the positive voltage turns it off. Diode 36 is likewise oriented to conduct current in the opposite direction from that of diode 28. In all other respects, the control circuit of transistor 18 is identical to the control circuit of transistor 16.

It should also be noted that the wipers of the variable resistors 32 and 42 have been ganged together, as is indicated by the dashed line, to provide equal discharge rates and therefore equal clamp release rates in both the positive and negative directions.

Due to the independence of the control signal from the voltage which is being clamped and limited in its rate of change, a degree of control freedom is realized. The clamp circuit may be operated manually or automatically and the gate logic block 25 and the sensor block 27 are shown in block form to indicate only generally a relation between the voltages at terminals A and C, D. Indeed, as long as there is knowledge to release the clamp at or after the appearance of the voltage at terminal A, there need be no external connection between terminals A and C, D at all. If a voltage appears at terminal A, it can be automatically clamped by the normally enabled transistors 16 and 18. The voltage at terminals C and D can then be switched manually to the opposite sense to release the clamp. The only circuitry that would be involved which is not shown but is represented by the gate logic block 25 would be a double pole switch so that terminals C and D could be switched at the same time. The gate logic block 25 which is shown coupled between terminals C and D thus may be only a mechanical or electrical switch. On the other hand, where it is decided that the clamp be applied or released at a fixed time after the application of a pulse at terminal A, the gate logic circuit can include appropriate switching circuitry such as counters and AND/OR gate logic. A sensor block 27 coupled to terminal A and to the gate logic block 25 indicates that a sensing scheme may be utilized to trigger the gate logic for the control circuits of the clamp when the presence of a voltage at terminal A is detected. This sensing circuit could also be eliminated if the source which generated the voltage which appears at terminal A were also to trigger the gate logic circuit 25. It is understood that if it is desirable to immediately release the clamp upon a voltage appearing at terminal A, counting or time delay would not be necessary in the gate logic circuit. Thus, the two blocks 27 and 25 are added to FIG. 1 only to show that a variety of combinations of triggering control of the expandable clamp circuit shown is possible.

It should also be recognized that because of the isolation between the integrating capacitors and the voltage pulses on the terminal A, B line, no phase shift is introduced in the line by the process of clamping and integrating the pulses on this line.

Referring now to FIG. 2, there is shown two voltage-time plots indicated by dashed lines 50 and 52 which represent the voltage clamp and release function of the transistors 16 and 18, respectively. If the circuit of FIG. 1 is operating in a mode where it clamps a voltage appearing at terminal A as soon as it appears, the effect of this operation is shown at point $t_0$ in FIG. 2. The voltage as seen at terminal B is substantially zero volts at time $t_0$ due to the clamping of transistor 16, if the voltage at A were positive as shown by dashed line 50, or by transistor 18, if the voltage were negative as indicated by the dashed line 52. At some time later, $t_1$, the gate logic block 25 will switch the polarity of or remove the voltages at terminals C and D to turn off the transistors 16 and 18 and the voltage at terminal B is permitted to expand to the maximum value which is indicated by the dashed lines 50 and 52 to the right of time $t_2$. This maximum value of expansion is determined by the voltage magnitude applied at terminals C and D and is completely independent of the value of the voltage appearing at terminal A. Thus, if the off voltage at terminals C and D is 10 volts, the emitters of the corresponding transistors 16 and 18 will follow and new voltage appearing at terminal A can expand to substantially this value. It is recognized that if the transistors are turned off merely by the removal of the turnon voltages at terminals C and D, there would be no limit on the expansion of the terminal A voltage except as dictated by the amplitude of this voltage itself.

The relationship between the control signal appearing at terminals C and D and the discharge voltages indicated as +V and −V at the upper terminals of variable resistors 32 and 42 respectively may be noted. If it is desired that the discharge of capacitors 24 and 26 be linear, it is desirable to make the voltages +V and −V relatively large. If at the same time, it is practical to expand the clamp to a large voltage such as the +V and −V voltage levels, then these supply sources can be utilized as the control signals. If, on the other hand, the expansion of the clamp must be limited to a low voltage value, and linearity of discharge is still desired, separate source voltages for the control signal will be needed. It should also be pointed out that where linearity of expansion is not needed, the supplies +V and −V may be done away with and the discharge paths for the capacitors 24 and 26 coupled to ground.

Many of the advantages and flexibilities of the expandable clamp circuit have been pointed out. However, it should be noted that the circuit is readily utilizable to control the rate of fall of a decreasing voltage. Thus, when a voltage appears at terminal A and it is desirable to reduce its rate of fall or rate of change toward zero, the gradual turn on of transistors 16 and 18 at a rate determined by the charge rate of capacitors 24 and 26 can be utilized to control the rate of fall.

Another advantage of the circuit that can be noted with reference to FIG. 2 is that while the rate of rise of a voltage is clamped to a maximum rate as indicated by dashed lines 50 and 52, the voltage at terminal A could rise at a slower rate or decrease within the waveform indicated by these dashed lines without being affected by the circuit parameters. This is particularly advantageous in a servo loop where the command is positive and as the servo nears the position of command, the voltage may rapidly go to zero or a minus value if the final position is overshot.

It should also be pointed out that the placement of the capacitors in the base circuit of transistors 16 and 18 utilizes the amplification of the transistors to permit small component values to be used in the capacitor circuits and still obtain the needed result of large signal integration.

What is claimed and desired to be secured by Letters Patent of the United States is:

1. An expandable clamp for controlling the rate of change of an intermittent voltage comprising controlled current conducting means having an input circuit and an output circuit, said intermittent voltage being applied to the output circuit and serving as the supply voltage for said controlled current conducting means, energy storage means coupled to the input circuit of said controlled current conducting means, means for charging said energy storage means, control means coupled to the input circuit of said controlled current conducting means, said control means supplying a signal to said input circuit to cause said energy storage means to charge along a given charge curve, said controlled current conducting means responsive to the charge of said energy storage means during charging to limit the magnitude of voltage applied to said output circuit as a function of said charge curve for a given time interval before reestablishing the applied voltage to its non-limited magnitude, the rate of turnoff of said controlled current conducting means being controlled by the charge of said energy storage means.

2. An expandable clamp circuit for limiting the rate of rise of voltage pulses appearing on a line comprising transistor means having an emitter-collector path coupled between said line and an electrical common, said voltage pulses serving as the supply voltage for said transistor means, capacitor means coupled in the base circuit of said transistor means, a source of control voltage coupled to the base circuit of said transistor means and to said capacitor means to normally discharge said capacitor means and enable said transistor means so that said transistor means is turned on when a voltage pulse appears on said line, the voltage pulse thereby being clamped to said electrical common, and control means coupled to the control voltage source to remove said voltage source from the base circuit and the capacitor means when said voltage pulse is clamped and to charge said capacitor means and turn off said transistor means, the rate of turnoff being controlled by said discharge.

3. An expandable clamp circuit as recited in claim 2 wherein said means to charge said capacitor comprises a second source of control voltage of polarity opposite to said first-named control voltage source, said control means coupling said second source of control voltage to the capacitor means and the base circuit upon removal of said first-named voltage source.

4. An expandable clamp circuit as recited in claim 3 further including a charge circuit and a discharge circuit for said capacitor means, said charge circuit including a rectifier oriented to conduct current only when said first-named control voltage source is coupled to said capacitor means.

5. An adjustable clamp for limiting the rate of change of an intermittent voltage comprising controlled current conducting means having a control circuit and a load circuit, said voltage being applied to the load circuit of said controlled current conducting means and serves as the supply voltage therefor, energy storage means coupled to the control circuit of said controlled current conducting means, and control means coupled to said energy storage means and the control circuit of said controlled current conducting means to apply a control signal to discharge said energy storage means and enable said controlled current conducting means to be turned on to clamp said voltage to a predetermined value when it appears at said load circuit, said control means removing said control signal when the supply voltage is clamped by said controlled current conducting means to allow charging of said energy storage means which charging turns off said controlled current conducting means, the rate of turnoff of said controlled current conducting means being controlled by the discharge of said energy storage means.

6. An adjustable clamp as recited in claim 5 wherein said control means applies said control signal each time said clamp is fully released and the pulse of said supply voltage has passed so that said controlled current conducting means is normally enabled to conduct and said energy storage means is normally discharged.

7. An adjustable clamp as recited in claim 5 wherein said controlled current conducting means is a pair of transistors, the emitter-collector path of each transistor being coupled to receive said supply voltage and the base electrode of each transistor comprising said control circuit.

8. An adjustable clamp as recited in claim 7 wherein one transistor is responsive to negative supply voltage and the other transistor is responsive to positive supply voltage.

9. An adjustable clamp as recited in claim 8 wherein said energy storage means comprises a pair of capacitors, one capacitor being coupled to the base of each transistor and each capacitor having a charge and a discharge circuit.

10. An adjustable clamp as recited in claim 9 wherein said control means is coupled to both capacitors and both base electrodes to apply a control signal of the appropriate polarity thereto.

11. An adjustable clamp for limiting the rate of change of a voltage on a line comprising a pair of transistors each coupled via its emitter-collector path between said line and an electrical common, one transistor being responsive to positive supply voltage and the other being responsive to negative supply voltage, the voltage on said line serving as the supply voltage for said transistors, a pair of capacitors, each capacitor coupled in the base circuit of one of said transistors, a source of control voltage for each transistor, control means coupling each source of control voltage to a base circuit to turn on said transistors and charge said capacitors, the charging of said capacitors limiting the turnoff rate of said transistors and thereby the rate at which the voltage on said line is clamped.

References Cited

UNITED STATES PATENTS

| | | | |
|---|---|---|---|
| 2,585,854 | 2/1952 | Scott | 323—9 |
| 2,486,208 | 10/1949 | Reinstra | 84—1.26 |
| 2,833,980 | 5/1958 | Hedgcock | 323—81 |
| 2,952,006 | 9/1960 | McCarter | 323—81 |
| 3,069,618 | 12/1962 | Pfaff | 323—9 |
| 3,070,712 | 12/1962 | Evans | 307—237 |
| 3,207,952 | 9/1965 | Brahm | 84—1.26 |
| 3,235,791 | 2/1966 | Miller | 307—237 |
| 3,379,959 | 4/1968 | Kruska | 323—22 |
| 3,407,260 | 10/1968 | Schrecongost | 84—1.26 |

DONALD D. FORRER, Primary Examiner

H. A. DIXON, Assistant Examiner

U.S. Cl. X.R.

307—264, 313